Feb. 1, 1927.

A. DELANGE

MUD GUARD

Filed May 9, 1924

Inventor
A. Delange

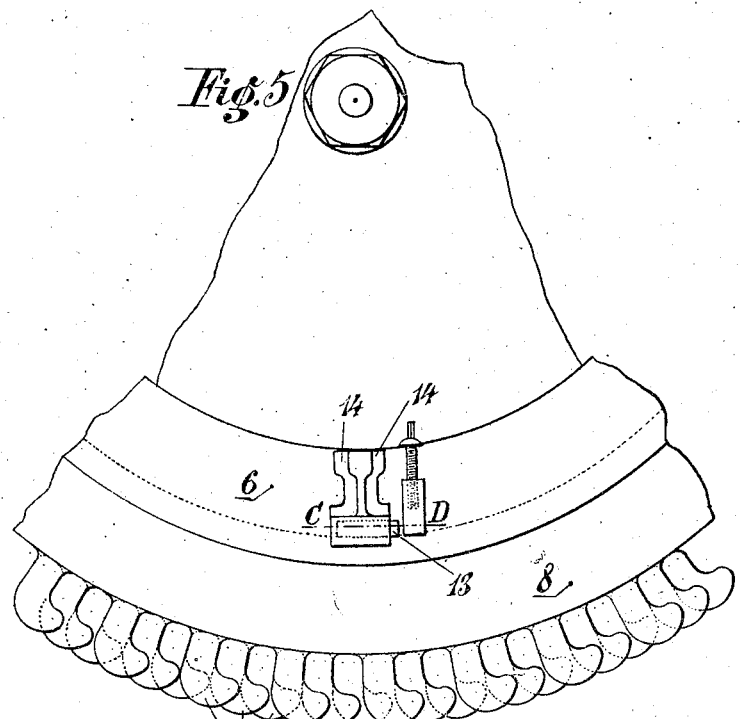
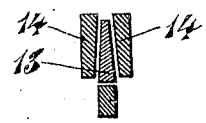
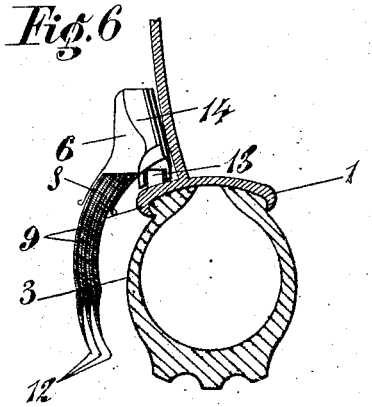

Patented Feb. 1, 1927.

1,616,115

UNITED STATES PATENT OFFICE.

AUGUSTE DELANGE, OF ROUEN, FRANCE.

MUD GUARD.

Application filed May 9, 1924, Serial No. 712,081, and in France May 9, 1923.

This invention has for its object a mud guard the characteristic features of which are as follows:

It entirely surrounds the outside of the wheel and hence it is formed integrally therewith. This arrangement avoids all friction upon the hub as well as the inconvenience resulting therefrom when the lubrication of the axis of the mud guard support is defective.

Owing to the arrangement of the flexible teeth the guard stops and canalizes and mud thrown about while preventing it from escaping axially and deadening the effects of centrifugal force.

The accompanying drawings show by way of example various forms of execution.

Fig. 5 is a modification of the manner of fixing the mud guard on the wheel rim.

Fig. 6 is a side view of Fig. 5 and Fig. 7 is a section on line C—D of Fig. 5.

Figure 1:
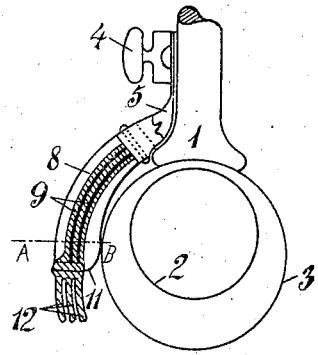
Fig. 1 is a portion of a side view of the mud guard mounted upon the wheel.
Figure 2:
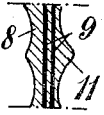
Fig. 2 is a sectional plan on line A—B of Fig. 1.
Figure 3:
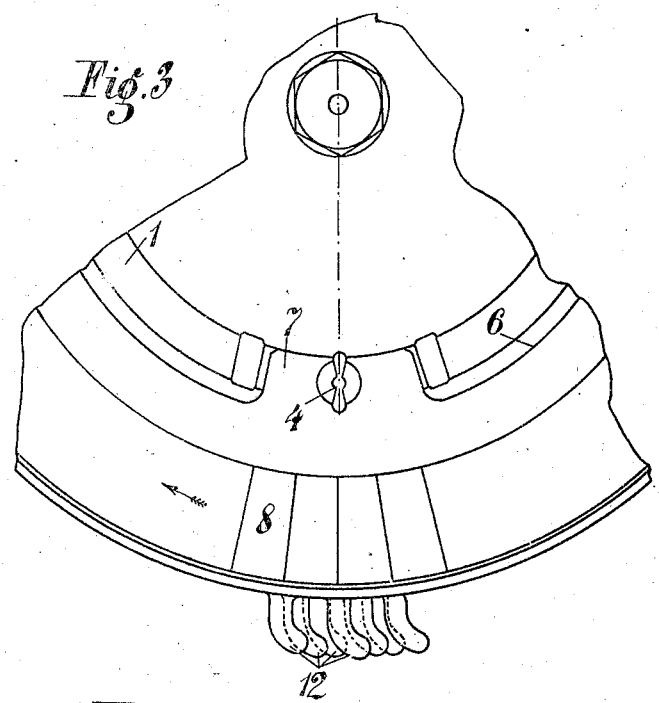
Fig. 3 is a portion of a longitudinal view of the wheel furnished with its mud guard.
Figure 4:
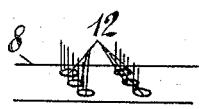
Fig. 4 is an underside view of the mud guard.

Upon the wheel rim 1 furnished with its inner tube 2 and its pneumatic tire 3, the mud guard is secured by means of a suitable number of bolts 4 (generally 3 at 120°).

This mud guard is composed of a circular crown piece 6 having the same shape as the wheel and furnished with shoulder pieces 7 whereby through the medium of bolts 4, the mud guard may be secured to the rim 1.

The whole of the segments turn entirely around the wheel and may be jointed one to the other. Each segment 8 of suitable resilient material (india rubber or the like) reinforced by canvas 9 having such a cross section that one of its edges 11 bears upon the pneumatic tire 3. The lower part of the segments is divided into teeth 12 arranged in quincunx along a given number of rows.

In Figs. 5, 6 and 7 the wheel rim 1 carries male conical pieces 13 and the crown piece 6 of the female pieces 14 surrounds the preceding ones. Any suitable number of such pieces may be used and preferably arranged in symmetrical order upon the circumference of the rim and of the crown piece while corresponding one to the other.

The joint action of the crown piece 6 with pieces 15 fixed to the former by screws 16 preventing the male part from moving out of its place 14. These pieces 15 may be less in number than those of the hooking on parts.

The mud thrown sidewise by the tire is stopped by the flexible teeth and canalized between them, while the teeth coming immediately behind them deaden the effects of centrifugal force by stopping the mud which may be thrown about tangentially. Besides the form of the teeth is such that centrifugal force would bring back the mud towards the inside whence it would be taken up by the row of median or inner teeth.

It should be well understood that the mud guard which forms the object of this invention may be carried out in other ways without departing from the nature of this invention, thus the number of rows of teeth, the mud guard and the like may vary within the limits of this invention.

I claim:

1. A rotating mud guard for vehicles, comprising a rim portion adapted to be removably secured to the wheel, and a flexible part to rest upon the wheel tire, the free edge of the flexible part being formed as independent rows of flexible teeth in relatively offset relation to avoid uninterrupted through spaces transversely of the teeth, said teeth having their terminals turned in the direction of forward travel of the wheel.

2. A rotating mud guard for vehicle wheel rims, composed of a circular crown piece secured to the rim of the wheel, and a flexible part overlying and extending toward the periphery of the tire on the rim, said flexible part being made up of superimposed reinforce segments, each formed with edge teeth, the teeth of the respective segments being relatively offset to avoid uninterrupted through spaces between the teeth.

3. A rotating mud guard for vehicle wheel rims, composed of a circular crown piece secured to the rim of the wheel, and a flexible part overlying and extending toward the periphery of the tire on the rim, said flexible part being made up of three superimposed reinforce segments, each formed with edge teeth, the teeth of the respective segments being relatively offset to avoid uninterrupted through spaces between the teeth.

In testimony whereof I affix my signature.

AUGUSTE DELANGE.